US008251627B2

(12) United States Patent
Inoue et al.

(10) Patent No.: US 8,251,627 B2
(45) Date of Patent: Aug. 28, 2012

(54) HOLDER DEVICE AND HIGH-PRESSURE PUMP HAVING THE SAME

(75) Inventors: Hiroshi Inoue, Anjo (JP); Katsunori Furuta, Obu (JP); Yoshihito Suzuki, Toyokawa (JP)

(73) Assignee: Denso Corporation, Kariya (JP)

( * ) Notice: Subject to any disclaimer, the term of this patent is extended or adjusted under 35 U.S.C. 154(b) by 494 days.

(21) Appl. No.: 12/483,695

(22) Filed: Jun. 12, 2009

(65) Prior Publication Data

US 2009/0311118 A1 Dec. 17, 2009

(30) Foreign Application Priority Data

Jun. 16, 2008 (JP) ................................ 2008-156424
Feb. 25, 2009 (JP) ................................ 2009-042481

(51) Int. Cl.
*F16B 21/18* (2006.01)

(52) U.S. Cl. ...................................................... 411/517

(58) Field of Classification Search .......... 411/517–519, 411/353, 530; 403/DIG. 7
See application file for complete search history.

(56) References Cited

U.S. PATENT DOCUMENTS 2,210,811 A * 8/1940 Kelpsch ........................ 403/332
3,910,566 A * 10/1975 Pedersen et al. .............. 267/167
4,019,824 A * 4/1977 Percy ............................ 403/261
4,728,132 A * 3/1988 Brammall ...................... 292/329
5,913,504 A * 6/1999 Nishimura et al. ............. 251/62
6,631,706 B1 10/2003 Yamada et al.
7,051,897 B2 * 5/2006 McGuire ....................... 220/321
7,540,274 B2 6/2009 Yamada et al.
7,707,996 B2 5/2010 Yamada et al.

FOREIGN PATENT DOCUMENTS

JP 48-27288 8/1973
JP 54-147353 10/1979
JP 2000-282459 10/2000
JP 2007-146861 6/2007

OTHER PUBLICATIONS

Japanese Office Action dated Jun. 7, 2010, issued in corresponding Japanese Application No. 2009-042481, with English translation.

* cited by examiner

*Primary Examiner* — Flemming Saether
(74) *Attorney, Agent, or Firm* — Nixon & Vanderhye P.C.

(57) ABSTRACT

A holder device has an elastic member and contact members. The elastic member is curved to extend approximately along a major arc of curvature and is elastically deformable to change a radius of curvature thereof. The contact members are circularly arranged along an inner circumferential side or an outer circumferential side of the elastic member so that each of the contact members is opposed to the elastic member in a radial direction of the elastic member. Each of the contact members has a sidewall that is opposed to the elastic member in the radial direction and is curved along an arc of curvature. A radius of curvature of the sidewall is shorter than the radius of curvature of the elastic member in its natural state.

2 Claims, 11 Drawing Sheets

HOLDER DEVICE AND HIGH-PRESSURE PUMP HAVING THE SAME

CROSS REFERENCE TO RELATED APPLICATION

The present application is based on and incorporates herein by reference Japanese Patent Applications No. 2008-156424 filed on Jun. 16, 2008 and No. 2009-042481 filed on Feb. 25, 2009.

BACKGROUND OF THE INVENTION

1. Field of the Invention

The present invention relates to a holder device that engages two or more members with each other in an axial direction of the members.

2. Description of Related Art

For example, a C-ring as a conventional holder device is described in JP2000-282459A and is used for preventing a target member mounted on a shaft from coming off. Generally, the C-ring is a thin ring-like member having a C shape that is curved along a circumference. When the C-ring is fitted to a target member, the C-ring is deformed in its radial direction. That is, an inner diameter of the C-ring is stretched beyond a shaft diameter of the target member, or an outer diameter of the C-ring is compressed below a bore diameter of the target member. The C-ring by being stretched or compressed in its radial direction is fitted, for example, to a groove that is formed on a shaft of the target member or on an interior wall of a bore of the target member. The C-ring adapts to a shape of the groove by its elastic force, and the body of the C-ring extends beyond the diameter of the shaft to prevent the target member from coming off from the shaft.

Such a C-ring is formed of a material having elasticity. It is necessary to design such a C-ring in a shape that enable the above-mentioned elastic deformation in the radial direction. If a thickness or a cross-sectional area of the C-ring is increased, rigidity of the C-ring rises and elasticity of the C-ring falls. Therefore, to ensure sufficient elasticity, the C-ring is generally designed to have a relatively small thickness and a relatively small cross-sectional area. However, if the C-ring contacts the target member in only a small area, the C-ring will receive any force from the target member in only the small area and the groove of the target member may collapse or the C-ring itself may be damaged, especially when an excessively large thrust force acts upon the C-ring. If hardness of the C-ring is raised by heat treatment and the like, the elasticity of the C-ring falls. Therefore, it is difficult to take effective measures for raising strength of the C-ring without resulting in disadvantages associated with reduced elasticity or the like.

In view of such disadvantages, JP2000-282459A describes an example in which notches are formed on a C-ring having a relatively large cross-sectional area and high rigidity. The C-ring can be elastically deformed at positions where a width of the C-ring is decreased in a radial direction by the notches. However, if such a C-ring is installed in such a position as to be subjected to excessively large thrust forces, it is necessary to apply a heat treatment to the C-ring to raise the surface hardness. However, if the rigidity of the whole body of the C-ring is raised by the heat treatment, the C-ring cannot be easily elastically deformed even at the positions where the C-ring has the notches. Therefore, the C-ring can break at the notches.

JP2000-282459A describes another example in which a C-ring is split into several split keys. The split keys are circularly arranged along a ring-like elastic member. An inner circumferential surface of the ring-like elastic member covers a whole of outer circumferential arc curved surfaces of the split keys. The split keys are fixed on the ring-shaped elastic member. It is possible to fix the split keys on the elastic member after raising rigidity and surface hardness of the split keys. However, in such a conventional C-ring, the inner circumferential surface of the elastic member is intimately fixed on the outer circumferential surface of the split keys. Therefore, the outer circumferential surface of the split keys inhibits deformation of the elastic member. Accordingly, a diameter of the C-ring can be compressed only to a small extent.

Furthermore, if such a C-ring is fitted to a groove of a target member, both of the elastic member and the split keys are in contact with sidewalls of the groove, and are pressed by the target member. Therefore, when the C-ring is subjected to excessively large thrust force, only the elastic member, which has low rigidity, may be plastically deformed. JP2000-282459A describes still another example in which several split keys and elastic members are alternately and circularly arranged. The elastic member is interposed between and thereby connects two split keys adjacent to each other. In such a C-ring, the elastic members are subjected to both of compressive force and tensile force when the C-ring is fitted. Therefore, the elastic members easily break, and can be easily detached from the split keys.

SUMMARY OF THE INVENTION

The present application is made in view of the above-mentioned and other disadvantages. Thus, it is an objective to provide a holder device that can prevent a member from coming off and can endure large thrust force.

To achieve the above and other objectives, a holder device having an elastic member and contact members is provided. The elastic member is curved to extend approximately along a major arc of curvature and is elastically deformable with respect to a radius of curvature. The contact members are circularly arranged along an inner circumferential side or an outer circumferential side of the elastic member so that each of the contact members is opposed to the elastic member in a radial direction of the elastic member. Each of the contact members has a sidewall that is opposed to the elastic member in the radial direction and is curved along an arc of curvature. The radius of curvature of the sidewall is shorter than the radius of curvature of the elastic member in its natural state.

BRIEF DESCRIPTION OF THE DRAWINGS

The invention, together with additional objectives, features and advantages thereof will be best understood from the following description, the appended claims and the accompanying drawings in which.

DETAILED DESCRIPTION OF THE EXEMPLARY EMBODIMENTS

Embodiments will be described hereafter with reference to accompanying drawings. A holder device such as a C-ring device according to a first embodiment is installed in a high-pressure pump mounted on a vehicle. Specifically, the C-ring is used for fixing a valve device that has a structure of a pilot valve.

First Embodiment

Figure 1:
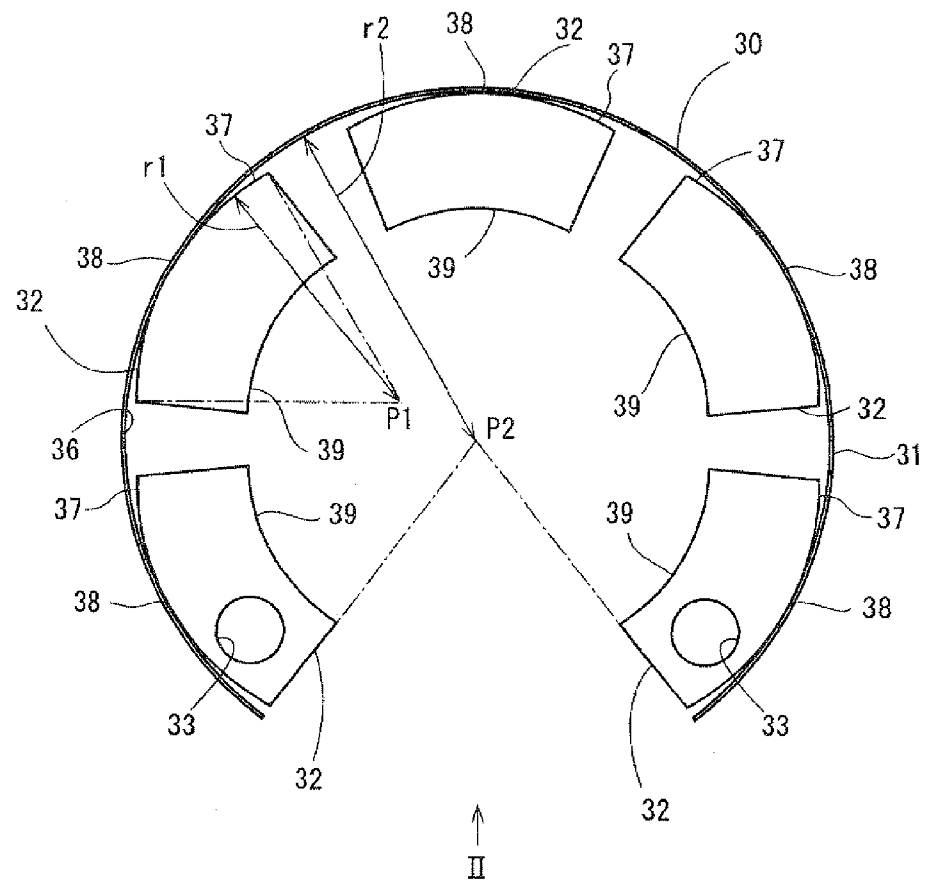
FIG. 1 is a diagram illustrating a plan view of an exemplary holder device according to a first embodiment.
Figure 2:
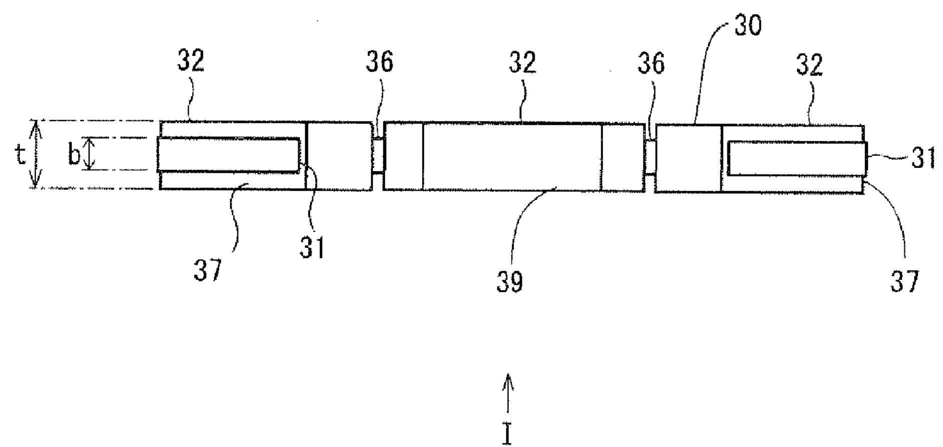
FIG. 2 is a diagram illustrating a side view of the exemplary holder device according to a first embodiment seen in a direction of an arrow II of FIG. 1.

FIGS. 1, 2 show a C-ring device 30 according to a first embodiment of the present invention.

The C-ring device 30 of the present embodiment is used in a construction that engages a first member with a second member in an axial direction indicated by an arrow I in FIG. 2. The C-ring device 30 corresponds to a holder device.

As shown in FIG. 1 and FIG. 2, the C-ring device 30 includes an elastic ring 31 and arc keys 32. The elastic ring 31 corresponds to an elastic member. The arc keys 32 corresponds to contact members.

The elastic ring 31 is a belt-like leaf spring made of metal such as a spring steel material having a high elasticity. As shown in FIG. 1, the elastic ring 31 is curved in a shape of a major arc of curvature that has a center point P2. A radius of curvature of an inner circumferential wall 36 of the elastic ring 31 is r2. The elastic ring 31 can be elastically deformed, so that the length r2, which is the radius of curvature of the elastic ring 31, is variable. Outer circumferential surfaces of the arc keys 32 are partially connected to the inner circumferential wall 36 of the elastic ring 31. The arc keys 32 are placed at approximately regular intervals along the major arc of the elastic ring 31. In the present embodiment, the number of the arc keys 32 is five.

The arc keys 32 are metal plates such as stainless steels plates, having elasticity and high rigidity. That is, the arc keys 32 are harder than the elastic ring 31. The elastic ring 31 has higher elasticity than the arc keys 32. In the present embodiment, the arc keys 32 are formed of a steel known as JIS SUS440C (AISI 440C, EN 1.4125) that is hardened by quenching process. The arc keys 32 have fanwise shapes when seen in a direction of an arrow I of FIG. 2. Specifically, each of the arc keys 32 constitutes a part of an annular ring. As shown in FIG. 1, each of the arc keys 32 has an outer circumferential surface 37 and an inner circumferential surface 39. A center of an arc on which the outer circumferential surface 37 extends is a point P1, and a radius of curvature of the outer circumferential surface 37 is r1. A center of an arc on which the inner circumferential surface 39 extends is the point P1. The inner circumferential surfaces 39 of the arc keys 32 are circularly curved surfaces that form an inner circumference of the annular ring.

The radius r1 of curvature of the outer circumferential surface 37 is shorter than a half of an inner diameter of the elastic ring 31. Therefore, when the elastic ring 31 is compressed in a radial direction, the radius r2 of curvature of the inner circumferential wall 36 is minimized and becomes approximately equal to the radius r1 of curvature of the outer circumferential surfaces 37 of the arc keys 32 as shown, for example, in FIG. 5. Moreover, as shown in FIG. 2, the five arc keys 32 are arranged on the same plane lying perpendicular to the direction of arrow I. The five arc keys 32 have the same thickness in the direction of arrow I. A breadth of the elastic ring 31, as measured in an axial direction of the C-ring device 30, is shorter than the thickness t of the arc keys 32, as measured in the axial direction. Each of the arc keys 32 is welded to the inner circumferential wall 36 of the elastic ring 31 at a fixing portion 38, which is an approximately central portion of the outer circumferential surface 37 in a circumferential direction of the C-ring device 30. Thereby, the elastic ring 31 and the arc keys 32 integrally form the C-ring device 30. Two of the arc keys 32 positioned at both ends of the elastic ring 31 in the circumferential direction, have assembly holes 33, respectively. When the C-ring device 30 is installed the C-ring device 30 is compressed in a radial direction by applying bending force through fixture tools inserted in the assembly holes 33.

Figure 3:
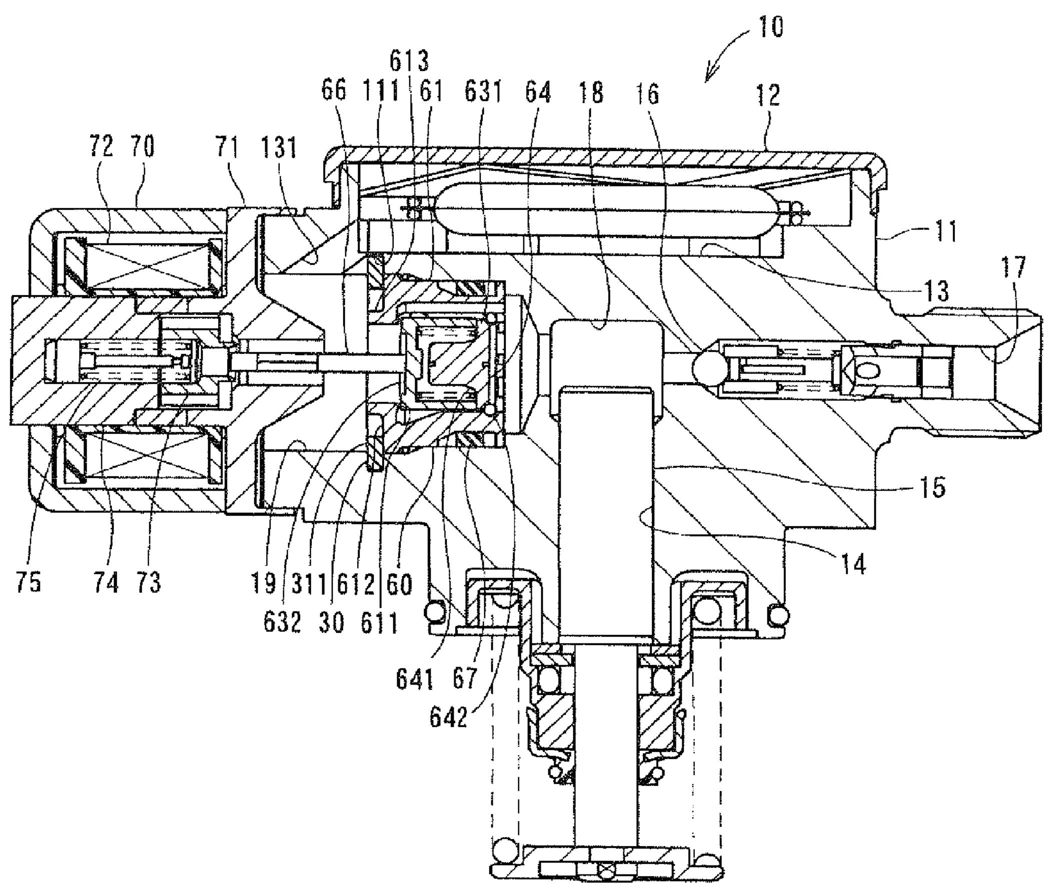
FIG. 3 is a diagram illustrating a cross-sectional view of an exemplary high-pressure pump having the holder device according to a first embodiment.
Figure 4A:
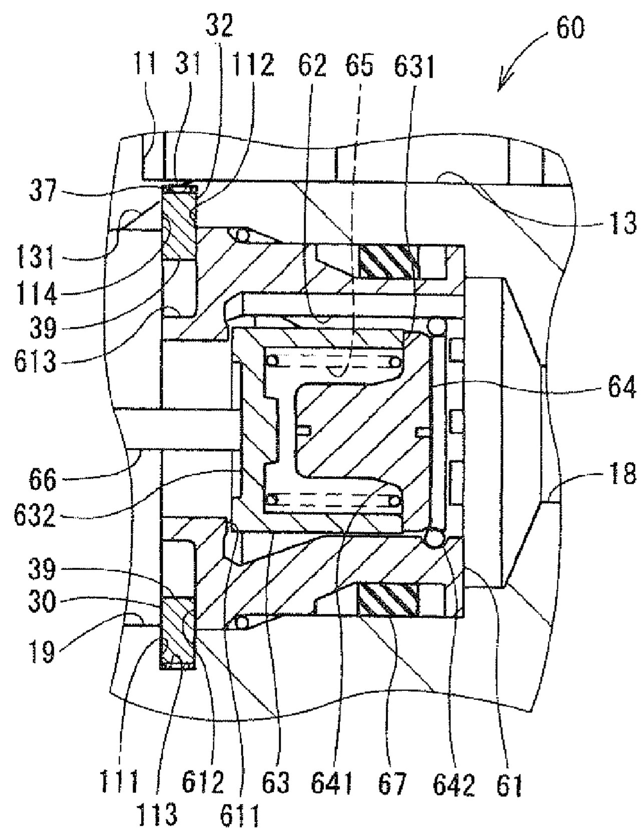
FIG. 4A is a diagram illustrating an enlarged cross-sectional view of a part of the high-pressure pump of FIG. 3.
Figure 4B:
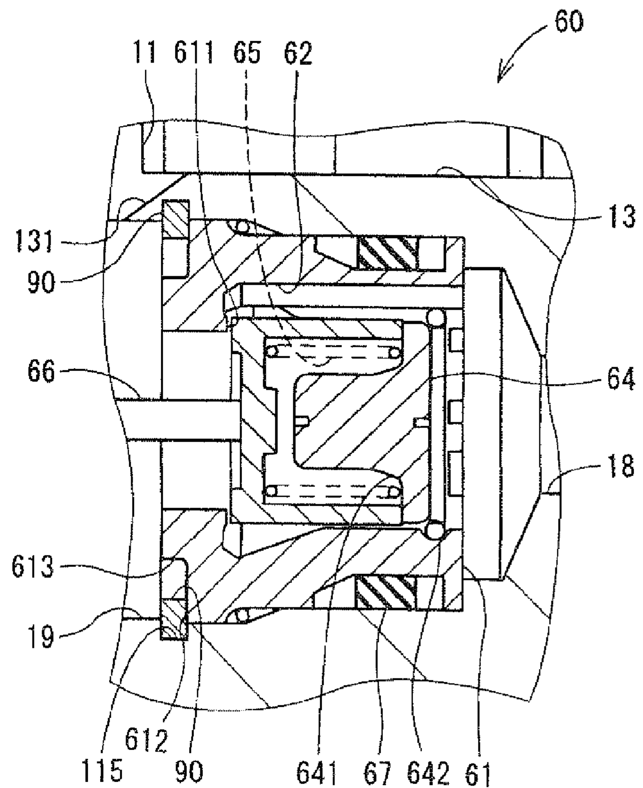
FIG. 4B is a diagram illustrating an enlarged cross-sectional view of a part of a high-pressure pump having a conventional holder device.
Figure 5:
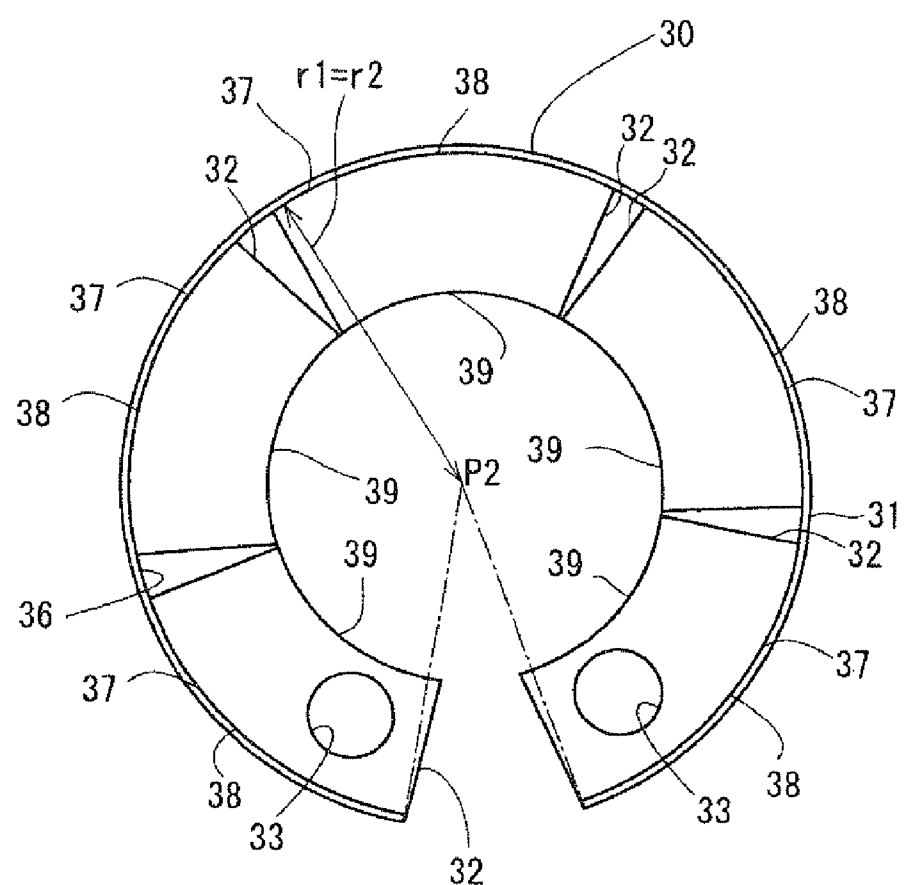
FIG. 5 is a diagram illustrating a plan view of the exemplary holder device according to a first embodiment.

Then, an application of the C-ring device 30 to the high-pressure pump according to the present embodiment will be described hereafter in detail with reference to FIG. 3 to FIG. 5. A high-pressure fuel pump 10 shown in FIG. 3 is, for example, a fuel supply pump that supplies fuel to injectors of a diesel engine or a gasoline engine. The high-pressure fuel pump 10 has a housing 11 as a principal element. The housing 11 is formed of, for example, martensite stainless steel. A cover 12 is attached on one side of the housing 11, and a fuel chamber 13 is defined between the housing 11 and the cover 12. A supply port (not shown) of the high-pressure fuel pump 10 communicates with the fuel chamber 13. An external feed pump (not shown) supplies the fuel from a fuel tank (not shown) to the supply port.

A cylinder 14 is formed on the opposite side of the housing 11 from the cover 12. A plunger 15 is reciprocatably supported in the cylinder 14. The housing 11 has a discharge portion 17, a pressurizing chamber 18 and a fuel passage 19. The discharge portion 17, the pressurizing chamber 18 and the fuel passage 19 are aligned on an axis perpendicular to another axis on which the cover 12 and the plunger 15 are aligned. The discharge portion 17 has a check valve 16. The pressurizing chamber 18 is defined between an end portion of the plunger 15 and a wall surface of the housing 11, and communicates with the discharge portion 17. The fuel passage 19 has an approximately cylindrical shape and communicates with the pressurizing chamber 18.

The fuel passage 19 opens to a side opposite from the discharge portion 17 of the housing 11. A metering valve 60 is installed on a pressurizing chamber 18 side of the fuel passage 19. An opening of the fuel passage 19 is closed by a valve cover 71, which forms a part of a magnetic circuit portion 70. A communicating passage 131 is formed in an interior wall that defines the fuel passage 19. The communicating passage 131 is positioned between the metering valve 60 and the magnetic circuit portion 70, and communicates with the fuel chamber 13. Accordingly, the fuel supplied to the fuel chamber 13 is further supplied to the fuel passage 19 through the communicating passage 131. Then, the fuel flows from the fuel passage 19 to the pressurizing chamber 18 through the metering valve 60, and is pressurized in the pressurizing chamber 18 by the plunger 15. The pressurized fuel urges the check valve 16 to a valve-opening side, and is pressure-fed from the discharge portion 17 to a fuel rail (not shown) that is connected to the injectors.

A construction of the metering valve 60 will be described hereafter in detail with reference to FIG. 4A. The metering valve 60 has a valve body 61, a valve member 63, a stopper 64, a spring 65 and a needle 66. The valve body 61 has a tubular shape. An outer diameter of the valve body 61 is approximately equal to an inner diameter of the fuel passage 19 so that the valve body 61 is fitted to the fuel passage 19. The valve member 63 is installed in an interior space 62 defined by the valve body 61, and has a bottomed tubular shape to open to the pressurizing chamber 18 side. The stopper 64 is located on the pressurizing chamber 18 side of the valve member 63 in the interior space 62 so that the stopper 64 is opposed to a pressurizing chamber 18 side end portion 631 of the valve member 63. Both ends of the spring 65 are connected with a bottom surface of the valve member 63 and an engaging surface 641 of the stopper 64, respectively. The needle 66 extends from a magnetic circuit portion 70 side, and is opposed to and can come in contact with a bottom portion 632 of the valve member 63. When a coil 72 is electrically energized, the magnetic circuit portion 70 generates magnetic attraction force and attracts an armature 73 integrated with the needle 66 toward a stator 74 located on an opposite side from the metering valve 60. When the coil 72 is not electrically energized, a spring 75 urges the armature 73 and the needle 66 toward the valve member 63. The valve member 63 and the needle 66 can reciprocate in an axial direction of the fuel passage 19.

A rubber seal 67 is attached on an outer circumference of the valve body 61. The rubber seal 67 seals a gap between the valve body 61 and the interior wall of the fuel passage 19. Thereby, the fuel in the fuel passage 19 passes through the interior space 62 of the valve body 61. One end portion of the valve body 61, opposite from the pressurizing chamber 18, protrudes radially inward to form a valve seat portion 611. When the bottom portion 632 of the valve member 63, opposed to the valve seat portion 611, seats on the valve seat portion 611, the interior space 62 is isolated from the fuel passage 19. When the bottom portion 632 of the valve member 63 lifts off the valve seat portion 611, the interior space 62 communicates with the fuel passage 19, and the end portion 631 of the valve member 63 is engaged with the engaging surface 641 of the stopper 64. A snap ring 642 is snapped to an interior wall of the valve body 61 to fix the stopper 64.

Here, the C-ring device 30 according to a first embodiment is used for fixing the metering valve in the pressurizing chamber 18 side in the fuel passage 19. The C-ring device 30 is installed around a small diameter portion 613 that is formed on an end surface 612 of the valve body 61, opposed to the magnetic circuit portion 70. The C-ring device 30 is fixed so that the outer circumferential surfaces 37 of the arc keys 32 are fitted to a groove portion 111 formed on the interior wall of the fuel passage 19 in the housing 11. The small diameter portion 613 protrudes into the fuel passage 19 in the axial direction by a length approximately equal to the thickness t of the arc keys 32 of the C-ring device 30. An outer diameter of the small diameter portion 613 is small enough to fit inside an approximately circular ring formed by the inner circumferential surfaces 39 of the arc keys 32 when the C-ring device 30 is compressed in its radial direction. A width of the groove portion 111, measured in the axial direction of the fuel passage 19, is approximately equal to the thickness t of the arc keys 32.

The C-ring device 30 and the metering valve 60 are installed in the housing 11 before the magnetic circuit portion 70 is attached to the housing 11. First, the valve member 63 is installed in the interior space 62 of the valve body 61, and one end of the spring 65 is inserted in and fixed to the valve member 63. Then, the stopper 64 is installed on the end portion 631 of the valve member 63 and on the other end of the spring 65, and the stopper 64 is fixed by the snap ring 642. Thereby, the metering valve 60 is assembled except the needle 66. Next, the metering valve 60, to which the rubber seal 67 is attached on the outer circumference of the valve body 61, is inserted into the fuel passage 19 from an end portion opposite from the discharge portion 17. In a state where a pressurizing chamber 18 side sidewall 112 of the groove portion 111 is aligned with the end surface 612 of the valve body 61, the C-ring device 30 is installed in the groove portion 111.

The C-ring device 30 is compressed in its radial direction by applying bending force at the assembly holes 33 to make an outer diameter of the C-ring device 30 smaller than an inner diameter of the fuel passage 19, and the C-ring device 30 is inserted into the fuel passage 19. In the state, for example, as shown in FIG. 5, the inner circumferential wall 36 of the elastic ring 31 adapts its shape to the outer circumferential surfaces 37 of the arc keys 32. The outer diameter of the C-ring device 30 is thereby decreased to a sum of the radius r1 of curvature of the outer circumferential surfaces 37 and a thickness of the elastic ring 31, measured in the radial direction of the C-ring device 30. By releasing the assembly holes 33 in a state where the C-ring device 30 is inserted to a position of the outer circumference of the small diameter portion 613 of the valve body 61, the elastic ring 31 expands by its elastic force, and adapts its shape to a bottom surface 113 of the groove portion 111. Thereby, end surfaces of the arc keys 32, opposite from the valve body 61, are in contact with a sidewall 114 of the groove portion 111, and the C-ring device 30 is prevented from moving toward the opening of the fuel passage 19. After the C-ring device 30 is fitted to the groove portion 111, the magnetic circuit portion 70, in which the needle 66 is integrally fixed to the armature 73, is attached to the housing 11 so that the valve cover 71 blocks the opening of the fuel passage 19. The valve cover 71 is fixed to the housing 11 by welding and the like to prevent fuel leakage out of the fuel passage 19.

Actions of the C-ring device 30 in a fuel pressurizing stroke of the above-described high-pressure fuel pump 10 according to the present embodiment will be described hereafter in detail. As commonly known, a high-pressure pump having a construction such as the high-pressure fuel pump 10 undergoes the pressurizing stroke while the plunger 15 moves from a bottom dead center to a top dead center. In the following description, a movement of the plunger 15 toward the pressurizing chamber 18 in FIG. 5 is referred to as an ascent of the plunger 15.

If the coil 72 of the magnetic circuit portion 70 is not electrically energized while the plunger 15 is ascending, the spring 75 urges the needle 66 to push the valve member 63, so that the valve member 63 lifts off the valve seat portion 611. Therefore, the ascent of the plunger 15 returns the fuel from the pressurizing chamber 18 to the fuel chamber 13 through the interior space 62 of the metering valve 60 and the fuel passage 19. If the coil 72 is energized, the magnetic attraction force generated by the magnetic circuit portion 70 moves the needle 66 away from the valve member 63. The valve member 63 is also urged by repulsive force of the spring 65, and seats on the valve seat portion 611. Thereby, the pressurizing chamber 18 is isolated from the fuel chamber 13. Then, fuel pressure in the pressurizing chamber 18 is raised by further ascent of the plunger 15. The check valve 16 in the discharge portion 17 opens when the fuel pressure in the pressurizing chamber 18 is raised to a predetermined pressure.

When the fuel pressure in the pressurizing chamber 18 is raised, thrust force that the C-ring device 30 receives from the valve body 61 rises, for example, to 10 kN. In consideration of the increase in thrust force, a contact area in which the C-ring device 30 shown in FIG. 4A is in contact with the end surface 612 of the valve body 61, is larger than a contact area in which a conventional C-ring 90 shown in FIG. 4B is in contact with the end surface 612 of the valve body 61. Furthermore, the arc keys 32 of the C-ring device 30 has high rigidity, so that the arc keys 32 are not easily deformed and are not easily worn down by the thrust force received from the valve body 61.

As described above, when the C-ring device 30 according to the present embodiment is installed in the high-pressure fuel pump 10, the C-ring device 30 can be compressed in a radial direction to a greater degree even if the axial thickness t, a radial width and an area of each of the arc keys 32 are large and the arc keys 32 are hardened. If the conventional C-ring 90 is used instead of the C-ring device 30 as shown in FIG. 4B in order to install the metering valve 60 in the housing 11 as described above, a contact area in which the C-ring 90 is in contact with an interior wall of a groove portion 115, formed in the housing 11, is small. A contact area in which the C-ring 90 is in contact with the end surface 612 of the valve body 61 is also small since a degree to which the C-ring 90 can be deformed in a radial direction depends on elastic force of the C-ring 90 itself. If a thickness and a cross-sectional area of the C-ring 90 are enlarged, the elastic force of the C-ring 90 will be decreased. Accordingly, it becomes difficult to elastically deform the C-ring 90 in a radial direction in order to fit the C-ring 90 to a target member.

In contrast, in the C-ring device 30 according to the present embodiment, a degree to which the C-ring device 30 can be deformed in the radial direction does not depend on material or rigidity of the arc keys 32. The degree of deformation is determined by the radius r1 of curvature of the outer circumferential surfaces 37 of the arc keys 32 and the radius r2 of curvature of the inner circumferential wall 36 of the elastic ring 31. Accordingly, it is possible to deform the C-ring device 30 in the radial direction to a greater or lesser degree by setting the radii r1, r2 to desired lengths, respectively. Furthermore, the breadth b of the elastic ring 31, on an outer side of the C-ring device 30, is smaller than the thickness t of the arc keys 32. Therefore, the elastic ring 31 does not easily come in contact with the sidewalls 112, 114 of the groove portion 111 of the housing 11 in a direction of the thrust force. Accordingly, the thrust force does not easily act on the elastic ring 31, and it is possible to inhibit abrasion and deformation of the elastic ring 31.

As described above, the C-ring device 30 according to the present embodiment can be used in a construction that engages two or more members with each other in a direction of thrust force. Specifically, the C-ring device 30 can be used for receiving large thrust force in such a construction that fixes the metering valve 60 subjected to high fuel pressure in the pressurizing chamber 18 of the high-pressure fuel pump 10. Since the C-ring device 30 can be easily deformed in a radial direction, it is easy to install the C-ring device 30. Since the strength of the C-ring device 30 in an axial direction is relatively large, it is possible to use the C-ring device 30 as a holder device that can prevent a member from coming off and can effectively endure large thrust force.

Second Embodiment

Figure 6:
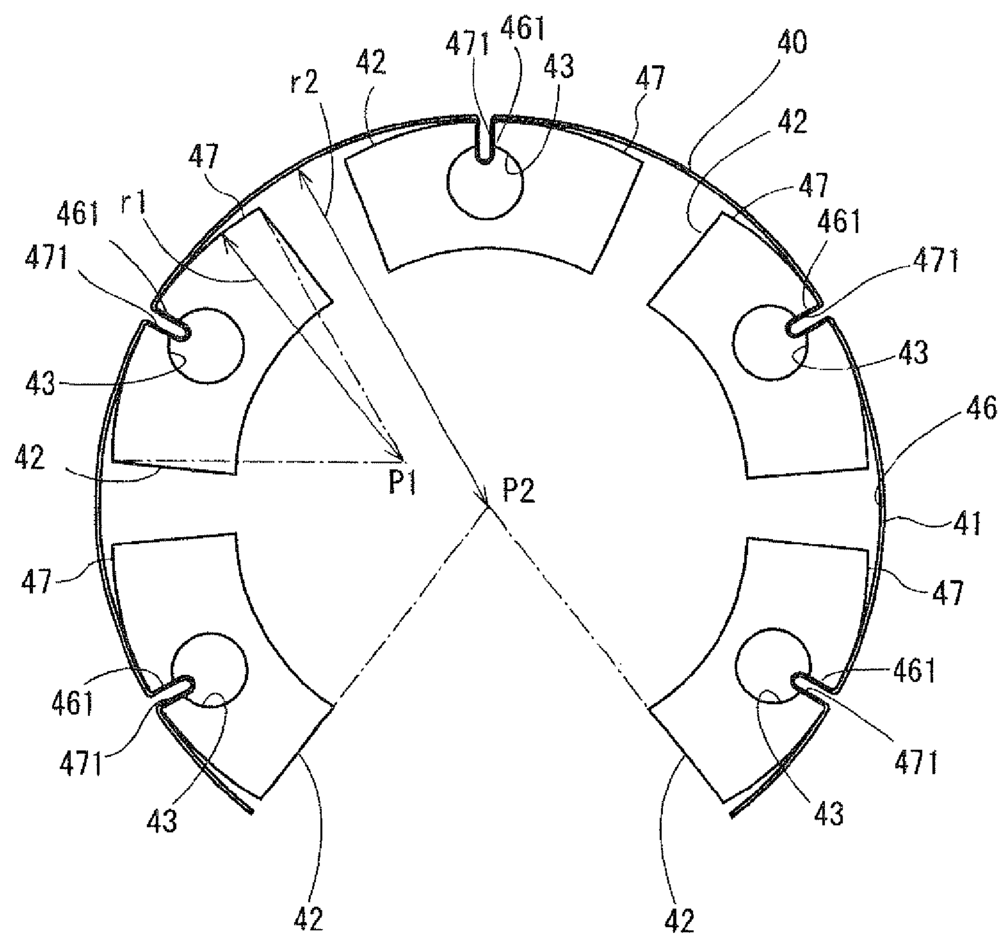
FIG. 6 is a diagram illustrating a plan view of an exemplary holder device according to a second embodiment.

FIG. 6 shows a C-ring device 40 according to a second embodiment of the present invention. Construction of the C-ring device 40 according to a second embodiment is basically the same as the construction of the C-ring device 30 according to a first embodiment. Elements of the C-ring device 40 according to a second embodiment, which are the same as in a first embodiment, will not be repeatedly described hereafter. The C-ring device 40 has connection portions 461. An elastic member, such as a belt-like elastic ring 41, is bent at several positions to protrude radially inward from an inner circumferential wall 46 to provide the connection portions 461. The C-ring device 40 is formed by inserting the connection portions 461 in engagement grooves 471 that are formed on outer circumferential surfaces 47 of arc keys 42. In a second embodiment, the elastic ring 41 and the arc keys 42 are fixed to each other after the engagement grooves 471 and the connection portions 461 are formed in advance. Therefore, when the elastic ring 41 and the arc keys 42 are fixed to each other, it is not necessary to align curved surfaces of the inner circumferential wall 46 and the outer circumferential surfaces 47 side by side with very high precision. That is, it is not necessary to take unsteadiness of the elastic ring 41 and the arc keys 42, caused by connecting two curved surfaces of which radii of curvature differ from each other, into account. Accordingly, it is possible to produce the C-ring device 40 by a simpler manufacturing process than in a first embodiment.

The arc keys 32 have assembly holes 43, which correspond to assembly holes 33 in a first embodiment, respectively. The assembly holes 43 open on end surfaces of the arc keys 42 in an axial direction of an annular ring formed by the circularly arranged arc keys 42. In a first embodiment, only two of the arc keys 32 have the assembly holes 33. Alternatively, as in a second embodiment the assembly holes 43 may be formed on all of the arc keys 42. In such a case, it is not necessary to prepare two kinds of arc keys 42, such as with and without the assembly hole 43. Accordingly, it is possible to simplify the manufacturing process of the C-ring device 40. In the present embodiment, as shown in FIG. 6, the engagement grooves 471 extend into the assembly holes 43. Alternatively, the engagement grooves 471 may be separated from the assembly holes 43. As a modification to a second embodiment, the arc keys 42 may not be provided with the assembly holes 43 by configuring the engagement grooves 471 to serve also as the assembly holes. According to such a modification, the C-ring device 40 can be compressed in a radial direction and can be fitted to a target member by using recesses on radially outer sides of the connection portions 461, that is, the recesses on an outer circumferential side of the elastic ring 41 is bent to extend into the engagement groove 471.

In the C-ring device 40 according to a second embodiment, it is not always necessary to connect the elastic ring 41 and the arc keys 42 fixedly by bonding, welding and the like. Specifically, it is possible to form the arc keys 42 separately from the elastic ring 41. In this case, the connection portions 461 of the elastic ring 41 are press-fitted to the engagement grooves 471 of the arc keys 42, so that the elastic ring 41 and the arc keys 42 are engaged with each other in the radial direction of the C-ring device 40. When the C-ring device 40 having such a construction is fitted to a target member, for example, to the groove portion 111 in the fuel passage 19 of the above-described high-pressure fuel pump 10, the arc keys 42 fit to the sidewalls 112, 114 of the groove portion 111. Therefore, it is not necessary to align end surfaces of the arc keys 42 on one imaginary plane with high precision.

As described above, according to a second embodiment, a holder device that can endure large or even excessive thrust forces can be provided by a relatively simple manufacturing process.

In accordance with a first and second embodiment, for example as described above, the holder device, such as the C-ring device 30, 40 is provided with elastic members such as the elastic ring 31, 41, located on a radially outer side, and contact members such as the arc keys 32, 42 located on a radially inner side. Another aspect provides a holder device in which contact members are circularly placed to form an annular ring, and an elastic member is arranged inside the annular ring which will be described hereafter with reference to FIGS. 7-12.

Third Embodiment

Figure 7:
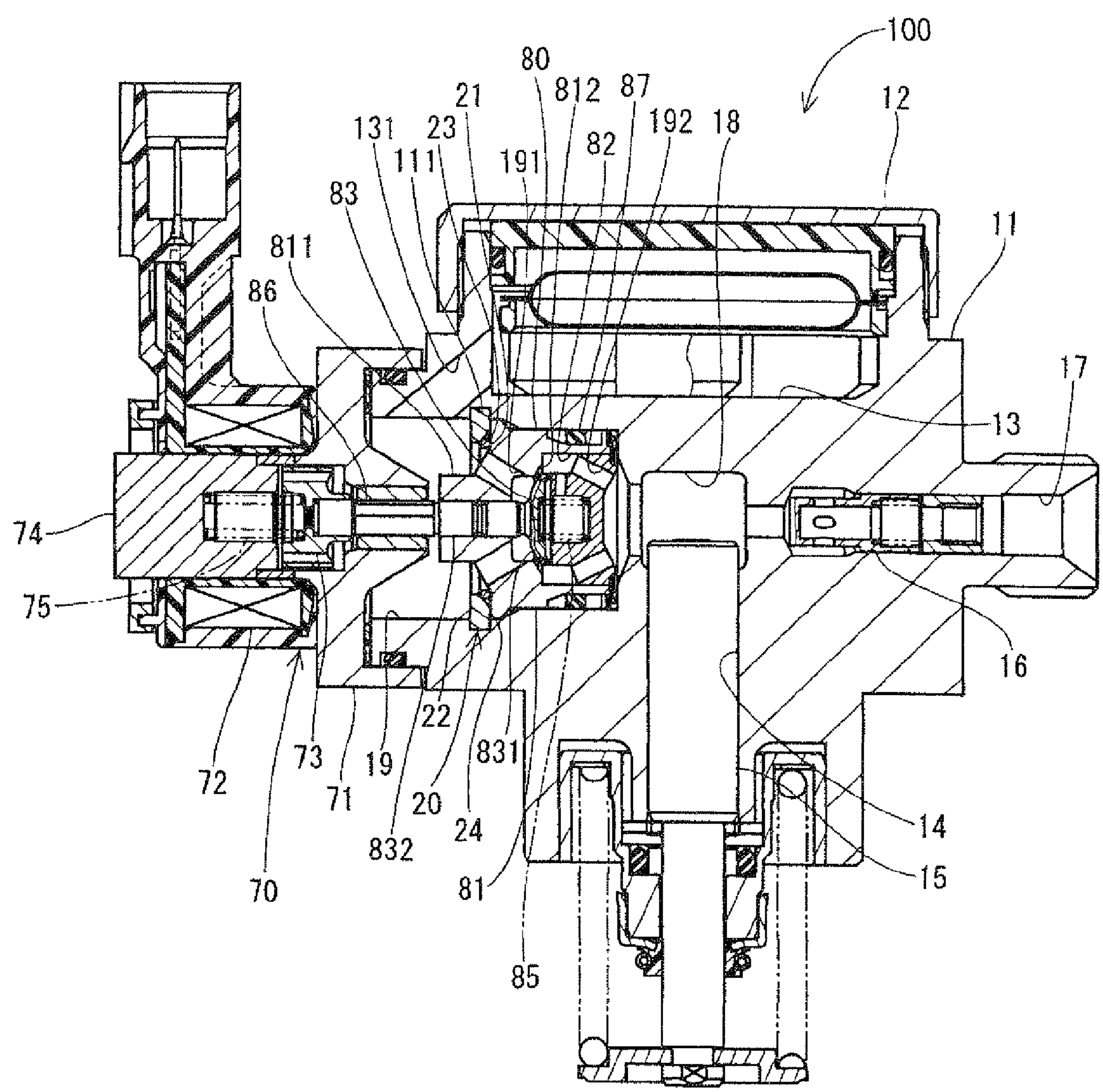
FIG. 7 is a diagram illustrating a cross-sectional view of an exemplary high-pressure pump having a holder device according to a third embodiment.
Figure 8A:
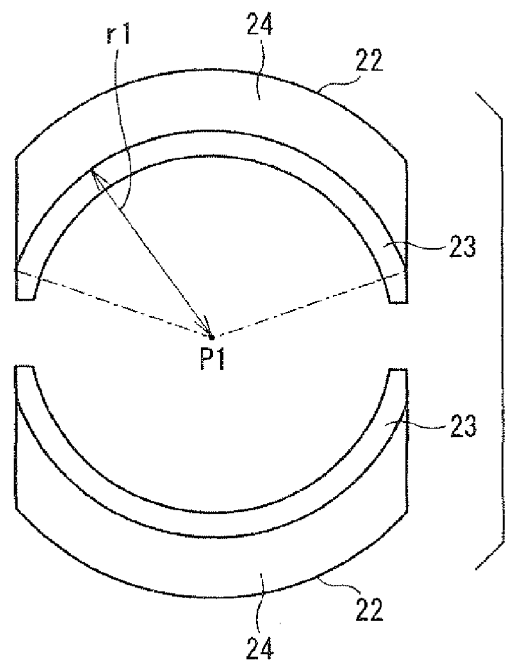
FIG. 8A is a diagram illustrating a plan view of exemplary contact members of the holder device according to a third embodiment.
Figure 8B:
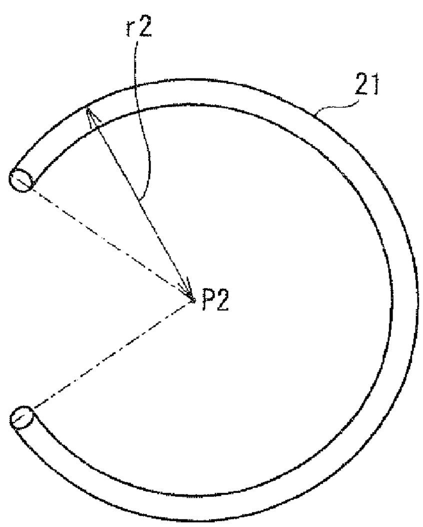
FIG. 8B is a diagram illustrating a plan view of an exemplary elastic member of the holder device according to a third embodiment.
Figure 9:
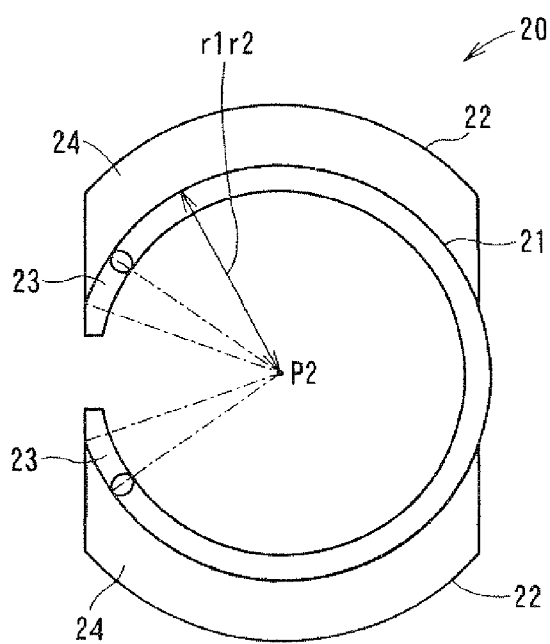
FIG. 9 is a diagram illustrating a plan view of the holder device according to a third embodiment.

A holder device 20 as described for example, in connection with FIG. 8A, FIG. 8B, and FIG. 9, according to a third embodiment, can be applied to a high-pressure fuel pump 100. A construction of the present embodiment is different from a first embodiment, and will be described hereafter with reference to FIG. 7. Like the high-pressure fuel pump 10 described in a first embodiment, the high-pressure fuel pump 100 shown in FIG. 7 is, for example, a fuel supply pump that supplies fuel to injectors of a diesel engine or a gasoline engine. The high-pressure fuel pump 100 in the present embodiment has substantially the same or equivalent construction as the high-pressure fuel pump 10 described in a first embodiment. Therefore, elements of the high-pressure fuel pump 100, which are substantially the same as or equivalent to those of the high-pressure fuel pump 10, are assigned with the same reference numerals as in a first embodiment, and a repetitive description is omitted for simplicity.

As illustrated in connection with FIG. 7, a metering valve 80, which can act as a valve portion, is installed in the high-pressure fuel pump 100. The metering valve 80 has a valve body 81, a valve member 83, a stopper 84, a spring 85 and a needle 86. The valve body 81 has a tubular shape. An outer diameter of the valve body 81 is approximately equal to an inner diameter of the fuel passage 19, so that the valve body 81 is fitted to the fuel passage 19. The valve member 83 is reciprocatably installed in an interior space 82 defined by the valve body 81 located on an opposite side from the pressurizing chamber 18. The stopper 84 is configured as a tubular shape having a bottom, and is located on the pressurizing chamber 18 side of the valve member 83 in the interior space 82 so that the stopper 64 is opposed to and opens to an umbrella portion 831 of the valve member 83. The spring 85 is installed in a cylindrical bore of the stopper 84 and urges the valve member 83 away from the stopper 84 in a reciprocating direction of the valve member 83. The needle 86 extends from a magnetic circuit portion 70 side, and is opposed to and can come in contact with a shaft portion 832 of the valve member 83. The needle 86 is integrated with the armature 73 of the magnetic circuit portion 70. Therefore, when the coil 72 is electrically energized, the needle 86 is attracted toward the magnetic circuit portion 70, that is, away from the pressurizing chamber 18. The valve body 81 has a guide cylinder portion 811 that cylindrically extends away from the pressurizing chamber 18 in the fuel passage 19. An inner circumferential wall of the guide cylinder portion 811 slidably guides the shaft portion 832 of the valve member 83.

A rubber seal 87 is attached on an outer circumference of the valve body 81. The rubber seal 87 seals a gap between the valve body 81 and the interior wall of the fuel passage 19. In this embodiment, passages 191 are formed in the valve body 81 on a radially outer side of the guide cylinder portion 811. The passages 191 communicate with the interior space 82. Thereby, in a suction stroke, the fuel flows from the fuel passage 19 to the interior space 82 in the valve body 81 through the passages 191. One end portion of the stopper 84 installed in the interior space 82, is in contact with the valve member 83 and has a relatively small diameter. The other end portion opposite from the valve member 83 has a relatively large diameter. An outer circumferential surface of the end portion of the stopper 84 having the relatively large diameter, is welded to an inner circumferential surface of the interior space 82 in the valve body 81. A space, defined between an outer circumferential surface of the one end portion of the stopper 84 and the inner circumferential surface of the interior space 82, communicates with a downstream side of the fuel passage 19, contiguous to the pressurizing chamber 18. Passages 192 are formed in a radially outer portion of the stopper 84. Thereby, in the suction stroke, the fuel is supplied from the interior space 82 to the pressurizing chamber 18 through the passages 192.

The valve member 83 includes the umbrella portion 831 and the shaft portion 832. The umbrella portion 831 has an approximately disk-like shape. When the umbrella portion 831 lifts off a valve seat portion 812 formed on the valve body 81, the metering valve 80 opens. When the umbrella portion 831 seats on a valve seat portion 812, the metering valve 80 shuts. The shaft portion 832 is coaxially arranged with the umbrella portion 831, and is axially connected to a magnetic circuit portion 70 side end surface of the umbrella portion 831. The shaft portion 832 is inserted into a cylindrical hole of the guide cylinder portion 811, and extends to come in contact with the needle 86. The valve seat portion 812 of the valve body 81 is formed on a radially outer side of the shaft portion 832 opposite from the pressurizing chamber 18, so that the valve seat portion 812 is opposed to an end surface of the umbrella portion 831 of the valve member 83.

In the construction according to a third embodiment, the holder device 20 is used for fixing the metering valve 80 in the pressurizing chamber 18 side of the fuel passage 19. As shown in FIG. 8A, FIG. 8B, and FIG. 9, the holder device 20 includes an elastic member such as the elastic ring 21 and contact members 22. The elastic ring 21 is curved approximately in a shape of a major arc. The elastic ring 21 can be elastically deformed, and a radius of curvature of the elastic ring 21 is variable. The contact members 22 are arranged on a radially outer side of the elastic ring 21. Each of the contact members 22 is a metal plate approximately having a shape of a part of an annular ring when it is seen from the pressurizing chamber 18 side in an axial direction of the fuel passage 19. As shown in FIG. 7, the holder device 20 is located on a radially outer side of the guide cylinder portion 811 of the valve body 81 to surround the guide cylinder portion 811 and the passages 191. The holder device 20 is fixed in a state where radially outer sides of the contact members 22 are fitted to a groove portion 111 formed on the interior wall of the fuel passage 19 in the housing 11. A width of the groove portion 111, measured in the axial direction of the fuel passage 19, is approximately equal to the thickness of radially outer portions of the contact members 22.

Construction of the holder device 20 according to the present embodiment will be described in detail with reference to FIG. 8A, FIG. 8B, and FIG. 9. FIG. 8A shows the contact members 22. FIG. 8B shows the elastic ring 21 seen from the discharge portion 17 side in the above-described high-pressure pump 100. In the present embodiment, the elastic ring 21 is separately formed from the contact members 22. As shown in FIG. 9, the holder device 20 is formed by installing the elastic ring 21 on a radially inner side of the contact members 22 when the high-pressure fuel pump 100 is assembled.

As shown in FIG. 8A, the holder device 20 according to the present embodiment has two contact members 22. As shown in FIG. 7 and FIG. 9, the contact members 22 have tapered surfaces 23. A cross-section of each of the contact member 22, taken in a radial direction of the holder device 20, has a tapered shape to provide the tapered surfaces 23. The tapered surfaces 23 have arc-like shapes. The tapered surface 23 in the present embodiment can correspond to a sidewall. Foremost ends of the contact members 22 have forefront surfaces 24 in an axial direction of an annular ring formed by the circularly arranged contact members 22, such as on a side opposed to the valve body 81. The tapered surface 23 is so formed as to gradually extend a radius as coming closer to the forefront surface 24. The contact member 22 is formed of a material such as stainless steel that has high rigidity, and is hardened by quenching process. Therefore, the contact member 22 can endure excessively large thrust force even when the contact member 22 receives the thrust force on the forefront surface 24 or on an aftermost side surface, opposite from the forefront surface 24. As shown in FIG. 8A, each of the contact members 22 forms a part of the annular ring that has a center point P1. A radius of curvature of an outer circumference of the tapered surface 23, which corresponds to a radius of curvature of an inner circumference of the forefront surface 24, has a length r1.

As shown in FIG. 8B, the elastic ring 21 of the holder device 20 according to the present embodiment is a metal wire made of a material such as spring steel having relatively large elasticity. The elastic ring 21 is curved approximately in a shape of a major arc that has a center point P2 so that a radius of curvature of an outer circumference of the elastic ring 21 has a length r2. The elastic ring 21 can be elastically deformed, so that the length r2, the radius of curvature of the elastic ring 21, is variable. As shown in FIG. 8A, the length r1, which forms the radius of curvature of the tapered surface 23 of the contact member 22, is shorter than the radius r2 of curvature of a radially outer side of the elastic ring 21 which can be curved approximately in a shape of a major arc. When the holder device 20 is formed, the elastic ring 21 is elastically deformed to shorten the variable length r2. As shown in FIG. 9, when the holder device 20 is assembled, the radius r2 of curvature of the elastic ring 21 is approximately equal to or slightly shorter than the radius r1 of curvature of the tapered surface 23 of the contact member 22.

The holder device 20 and the metering valve 80 are installed in the housing 11 before the magnetic circuit portion 70 is attached to the housing 11. The valve member 83 is installed in the interior space 82 of the valve body 81 by inserting the shaft portion 832 into a hole of the guide cylinder portion 811. One end of the spring 85 is then inserted in and fixed to a radially inner side of the umbrella portion 831 of the valve member 83. The other end of the spring 85 is inserted in and fixed to an inside of the stopper 84. The stopper 84 is opposed to the umbrella portion 831 of the valve member 83 so that the stopper 84 can come in contact with the umbrella portion 831 of the valve member 83, and the stopper 84 is press-fitted to one side of the valve body 81, opposite from the valve member 83. The stopper 84 and the valve body 81 are then fixed to each other by welding, so that the metering valve 80 is assembled except the needle 86. The metering valve 8 having a rubber seal 87 attached on the outer circumference of the valve body 81, is inserted into the fuel passage 19 from an end portion opposite from the discharge portion 17, and the holder device 20 is installed in the groove portion 111.

When the holder device 20 is installed in the housing 11 the contact members 22 are installed through an inside of the fuel passage 19. The contact members 22 are installed in the groove portion 111 so that the contact members 22 adjoin the metering valve 80 and form an annular ring on a downstream side of the metering valve 80. The contact members 22 are installed so that radially outer sides of the contact members 22 are fitted to the groove portion 111 and the forefront surfaces 24 of the contact members 22 are opposed to the valve body 81 of the metering valve 80. By keeping the elastic ring 21 compressed in a radial direction, the elastic ring 21 is installed on a radially inner side of the forefront surfaces 24 of the contact members 22 through an inside of the fuel passage 19. As shown in FIG. 7, the elastic ring 21 is compressed in a radial direction and is inserted into the fuel passage 19 so that the elastic ring 21 abuts the metering valve 80 and is fitted in an annular groove defined by the valve body 81 and the tapered surface 23. Then, the elastic ring 21 expands in a radial direction by an elastic force, so that the shape of the elastic ring 21 is adapted to the tapered surface 23 and urges the contact members 22 radially outward. Thereby, the contact members 22 move radially outward to a bottom of the groove portion 111. Accordingly, the holder device 20 is positioned in the groove portion 111 in an interior wall of the housing 11 so as to be inhibited from moving toward the opening of the fuel passage 19.

After the metering valve 80 is fixed in the fuel passage 19 by the holder device 20 as described above, the magnetic circuit portion 70, to which the needle 86 is attached integrally with the armature 73, is mounted on the housing 11 so that the valve cover 71 blocks the opening end of the fuel passage 19. In the high-pressure fuel pump 100 according to the present embodiment, a rubber seal and the like seals a gap between the housing 11 and the valve cover 71 to prevent fuel leakage from the fuel passage 19.

As described above, in the holder device 20 according to the present embodiment, the contact members 22 are separately formed from the elastic ring 21. The contact members 22 receive thrust force from the valve body 81 of a target member such as the metering valve 80, fixed to the housing 11 by the holder device 20. The elastic ring 21 urges the contact members 22 radially outward to position the contact members 22. Although the contact members 22 themselves do not have elasticity, the elasticity of the elastic ring 21 can change the curvature of radius of the holder device 20. Therefore, it is possible to install the holder device 20 by the above-described simple installation process. The shape of the elastic ring 21 is adapted to a side wall such as the tapered surfaces 23 formed on a radially inner side of the contact members 22 so that the elastic ring 21 is in contact with an entire circumference of the tapered surface 23. The radially outward urging force, generated by the elastic deformation of the elastic ring 21, acts on the entire circumference of the holder device 20. Thereby, the structure of the holder device 20 is stable when it is installed on the housing 11.

The elastic ring 21 is located on a side contiguous to the valve body 81 such as on the forefront surface 24 side of the tapered surface 23. The elastic ring 21 is thereby supported by the contact members 22 from the aftermost side of the holder device 20 in the axial direction. In the present state, the elastic force of the elastic ring 21 urges the elastic ring 21 to radially expand. Therefore, the tapered surfaces 23 of the contact members 22 prevents the elastic ring 21 from moving away from the pressurizing chamber 18 in the fuel passage 19. Therefore, when the holder device 20 is installed, it is possible to prevent the elastic ring 21 from coming off though the elastic ring 21 is a member separately formed from the contact members 22. In addition, in the present embodiment, it is possible to prevent the elastic ring 21 from coming off by forming the sidewalls of the contact members 22 on the tapered surfaces 23. Accordingly, it is easy to form the sidewall for preventing the elastic ring 21 from coming off.

As described above, in the holder device 20 according to the present embodiment, it is not necessary to provide the contact members 22 with elasticity. Therefore, the contact members 22 of the holder device 20 may be formed of a material having relatively high hardness. Accordingly, it is possible to raise surface hardness and rigidity of the contact members 22. As a result, the holder device 20 can endure excessively large thrust force in order to prevent the metering valve 80, which receives large thrust force from inner pressure in the pressurizing chamber 18, from coming off, for example.

Fourth Embodiment

In a third embodiment, for example as described above, the sidewalls of the contact members 22, opposed to the elastic ring 21, are formed as the tapered surfaces 23. In a fourth embodiment that will be described hereafter, the shape of the sidewall of the contact member is modified from that in a third embodiment, in order to inhibit the elastic ring 21 from receiving excessively large thrust force from the valve body 81. A holder device 25 according to a fourth embodiment will be described hereafter with reference to FIG. 10 and FIG. 11.

Figure 10:
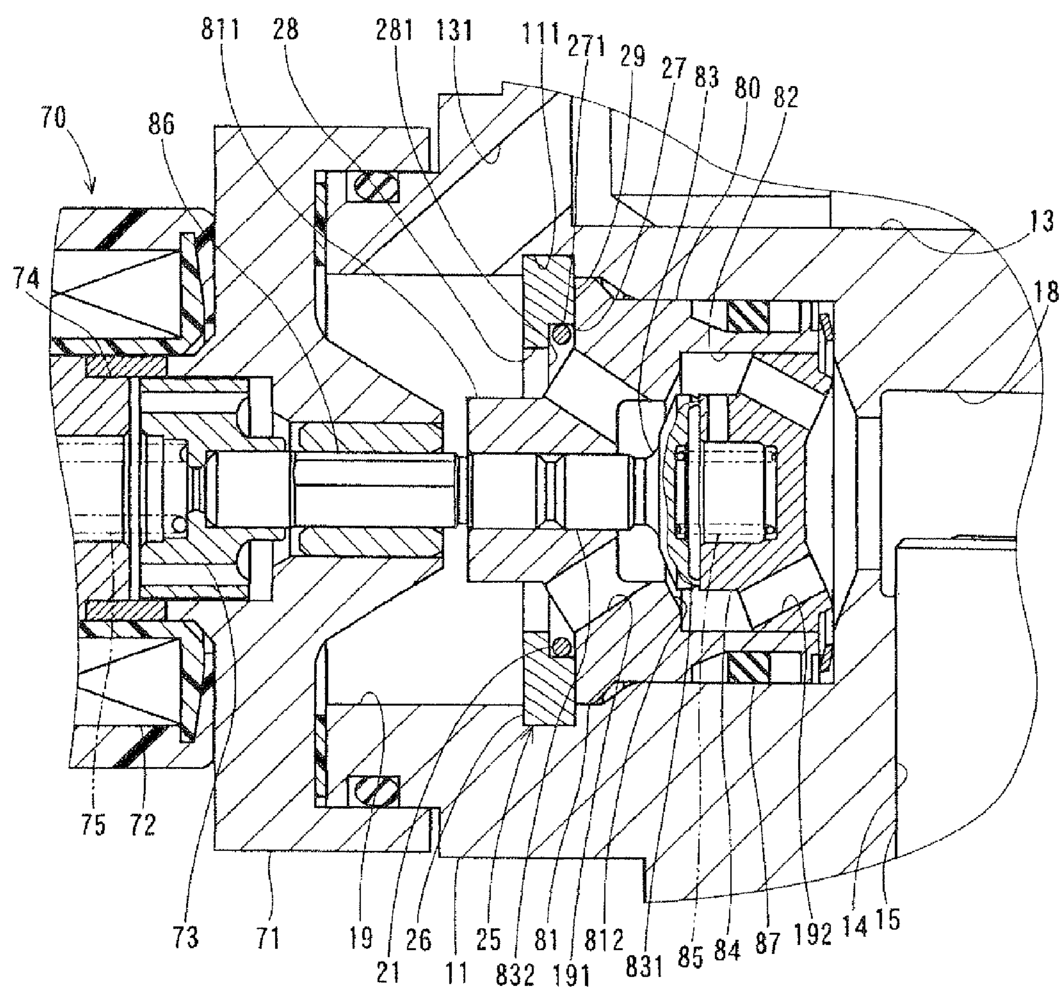
FIG. 10 is a diagram illustrating a cross-sectional view of a part of a high-pressure pump having a holder device according to a fourth embodiment.

In a fourth embodiment shown in FIG. 10, a high-pressure fuel pump 100 has substantially the same construction as in a third embodiment. The high-pressure fuel pump 100 in a fourth embodiment is provided with the holder device 25 instead of the holder device 20, as in a third embodiment. Shapes of contact members 26 of the holder device 25 in a fourth embodiment are different from shapes of the contact members 22 of the holder device 20 in a third embodiment. Elements of the high-pressure fuel pump 100 in a fourth embodiment that are substantially the same as or equivalent to those of the high-pressure fuel pump 100 in a third embodiment, are assigned with the same reference numerals as in a third embodiment, and a repetitive description as been omitted.

Figure 11:
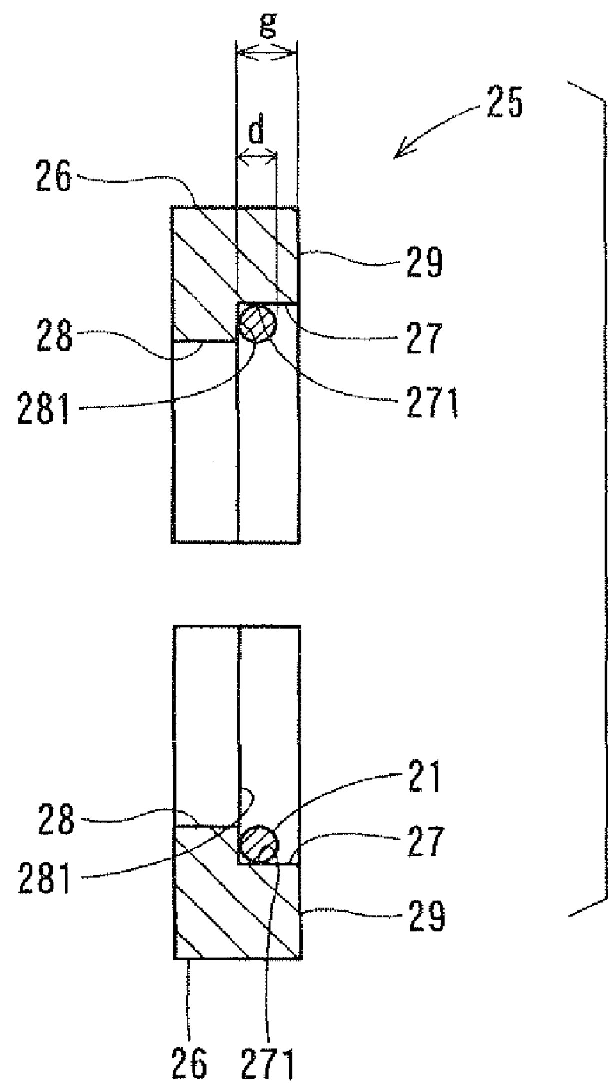
FIG. 11 is a diagram illustrating a cross-sectional view of the holder device according to the a embodiment.

As shown in FIG. 10 and FIG. 11, the holder device 25 according to the present embodiment includes an elastic ring 21 and the contact members 26. The elastic ring 21 acts as the elastic member. When the holder device 25 is viewed from the pressurizing chamber 18 side in the axial direction of the fuel passage 19, the two contact members 26 are arranged to form an annular ring as in a third embodiment shown in FIG. 9. Each of the contact members 26 has a large diameter portion 27 and a small diameter portion 28. The large diameter portion 27 is formed on a foremost side of each of the contact members 26 in an axial direction of the annular ring formed by the contact members 26. The small diameter portion 28 is located on an aftermost side in the axial direction. An inner diameter of the annular ring is larger in the large diameter portion 27 than in the small diameter portion 28. That is, a step is formed on a radially inner side of each of the contact members 26. The step divides the radially inner side into two circularly curved surfaces having different inner diameters. Inner circumferential surfaces 271 of the large diameter portions 27, that is, the circularly curved surfaces on a radially inner side of the large diameter portions 27, correspond to the sidewalls. As shown in FIG. 10, the contact members 26 are arranged so that the foremost sides, on which the large diameter portions 27 are formed, are opposed to the valve body 81. Each of the contact members 26 has a step surface 281 contiguous to an aftermost side of the inner circumferential surface 271 of the large diameter portion 27 in the axial direction. That is, the step surface 281 is formed on the foremost side of the small diameter portion 28 in the axial direction, and is opposed to the valve body 81. Each of the contact members 26 has a forefront surface 29 on a foremost side end in the axial direction, that is, on a foremost end that comes in contact with the valve body 81.

The contact members 26 are installed in the groove portion 111 of the housing 11 by a method as in a third embodiment. The elastic ring 21 is installed to be opposed to the inner circumferential surfaces 271 of the large diameter portion 27 of the contact members 26 in a radial direction. As shown in FIG. 10, the elastic ring 21 is installed through an inside of the fuel passage 19 into a groove defined by the step surfaces 281 between the large diameter portions 27 and the small diameter portions 28 of the contact members 26 and the valve body 81. The interior wall of this groove has a shape recessed radially outward from an inner circumference of the small diameter portions 28 of the contact members 26 in an approximately annular shape. The step surface 281, the inner circumferential surface 271 of the large diameter portion 27 and an end surface of the valve body 81, on an opposite side from the pressurizing chamber 18 in the axial direction, form the interior wall of the groove. The forefront surfaces 29 of the contact members 26 are in contact with the end surface of the valve body 81, on the opposite side from the pressurizing chamber 18 in the axial direction. Therefore, a width of the above-mentioned groove is approximately equal to a length of the large diameter portion 27 measured in the axial direction, that is, a distance from an imaginary place that contains the forefront surfaces 29 to the step surface 281.

FIG. 11 illustrates an enlarged cross-section of the holder device 25 shown in FIG. 10. In FIG. 11, the width of the above-mentioned groove is shown as a groove having a width g. As shown in FIG. 11, a width that the elastic ring 21 fitted in the groove occupies in the axial direction of the holder device 25 is relatively smaller. That is, a wire diameter d of a metal wire that forms the elastic ring 21 is smaller than the groove width g. Accordingly, the elastic ring 21 is positioned on the forefront surface 29 side than the step surface 281 and on an aftermost side than the forefront surface 29 in the axial direction of the annular ring formed by the circularly arranged contact members 26. In other words, a space that the elastic ring 21 occupies in the axial direction is within the length g of the large diameter portion 27, measured in the axial direction.

By the above-described construction, when the holder device 25 is installed in the housing 11 as shown in FIG. 10, the elastic ring 21 expands in a radial direction by an elastic force. Accordingly, the shape of the elastic ring 21 is adapted to the inner circumferential surface 271 of the large diameter portion 27, and the contact members 26 are urged radially outward. The elastic ring 21 is arranged on the forefront surface 29 side than the step portion 281, that is, on a side contiguous to the valve body 81. An aftermost side of the elastic ring 21 is thereby supported by the contact members 26. The step surfaces 281 of the small diameter portions 28 prevents the elastic ring 21 from moving away from the pressurizing chamber 18 in the fuel passage 19. Accordingly, it is possible to prevent the elastic ring 21 from coming off though the elastic ring 21, which can be separately formed from the contact members 26.

In a case where the sidewalls of the contact members are formed in tapered shapes as in a third embodiment, an excessively large thrust force can act on the elastic ring 21 from the valve body 81. The elastic ring 21 moves toward the valve body 81 in accordance with an expansion of the elastic ring 21 in the radial direction because the elastic ring 21 is installed in a tapered groove as defined, for example, by the tapered surfaces 23 and the end surface of the valve body 81, opposite from the pressurizing chamber 18, gradually narrowed as going radially outward, in a third embodiment. In contrast, in the present embodiment, the elastic ring 21 is fitted in the groove having a groove width g that is longer than the wire diameter d of the elastic ring 21. It is thereby possible to prevent the elastic ring 21 from receiving thrust force from the valve body 81. By configuring the holder device 25 according to the present embodiment, it is possible to receive the thrust force from the valve body 81 only at the contact members 26 without bringing the elastic ring 21 in contact with the valve body 81. Accordingly, it is possible to prevent wear of the elastic ring 21. Moreover, as in the above-described embodiments, the holder device 25 can endure a large and possibly excessive thrust force by raising surface hardness and rigidity of the contact members 26.

Fifth Embodiment

As described above in accordance with a third and fourth embodiment, the elastic ring 21, which acts as the elastic member, is formed of metal wire. Alternatively, the elastic member may have other constructions. A holder device 200 according to a fifth embodiment is applied to a high-pressure fuel pump 100 that has substantially the same construction as in a third and fourth embodiments. A fifth embodiment will be described hereafter with reference to FIG. 12.

Figure 12:
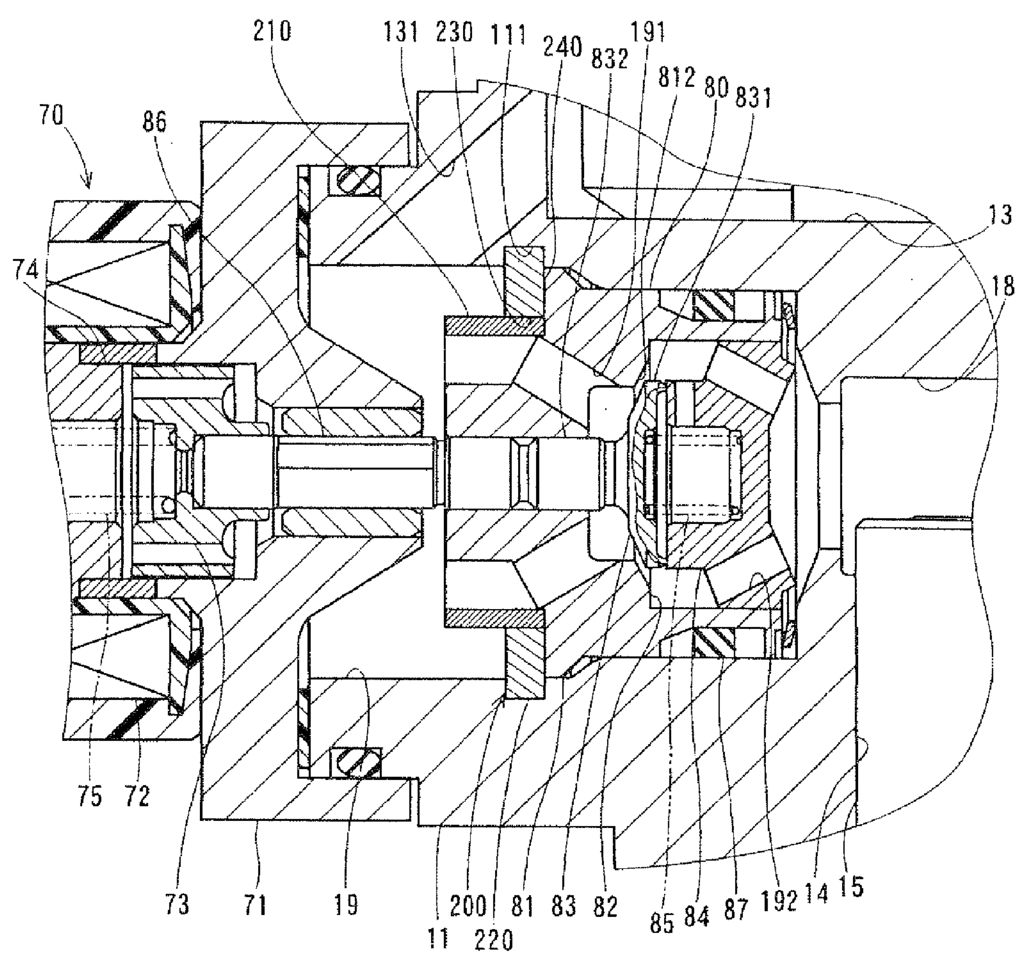
FIG. 12 is a diagram illustrating a cross-sectional view of a principal part of a high-pressure pump having a holder device according to a fifth embodiment.

As shown in FIG. 12, the holder device 200 according to a fifth embodiment includes an elastic member 210 and contact members 220. In the present embodiment, the elastic member 210 is made of a material such as spring steel having a relatively large elasticity. The elastic member 210 has a thin-walled cylindrical tubular shape of which a part is removed in a circumferential direction to have an approximately major arc-like cross-section. The shape of the elastic member 210 is similar to a shape of the elastic ring 31 in a first embodiment, which has a leaf spring shape as shown in FIG. 1. However, in the present embodiment, the elastic member 210 may be longer than a thickness of the contact members 220 in the axial direction, as shown in FIG. 12. The contact members 220 have inner circumferential surfaces 230 configured as sidewalls having circular arc-like cross-section. Two or more contact members 220 are arranged on a radially outer side of the elastic member 210 so that the inner circumferential surfaces 230 of the contact members 220 are opposed to the elastic member 210. Cross-sectional shapes of the contact members 220, taken perpendicularly to an axial direction of the fuel passage 19, are substantially the same as those of the contact members 22 in a first embodiment shown in FIG. 8A and FIG. 9.

The sidewalls of the contact members 220, which are opposed to the elastic member 210 in the radial direction, form the entire of the inner circumferential surfaces 230 of the contact members 220, different from a third and fourth embodiments in which the sidewalls are formed on the forefront surface side in the axial direction. Thus, it is not always necessary to form the contact members 220 in tapered shapes or in stepped shapes. By eliminating manufacturing process for forming the tapered shape or stepped shape, the contact members 220 can be easily manufactured. Moreover, the elastic member 210 has a shape of a part of a cylindrical tube that is longer in an axial direction than the thickness of the contact members 220. Therefore, when the holder device 200 is installed, one end of the elastic member 210 is inserted into a radially inner side of the contact members 220. Upon insertion, the elastic member 210 is elastically deformed to be compressed in a radial direction, and the one end of the elastic member 210 is inserted into the radially inner side of the contact members 220. Then, the elastic member 210 expands in a radial direction and the shape is adapted to the inner circumferential surfaces 230 of the contact members 220. Thereby, the elastic member 210 urges the contact members 220 radially outward and positions the contact members 220 in the groove portion 111 of the housing 11. In the holder device 200 according to the various exemplary embodiments, the elastic member 210 has a cotter pin-like shape. Accordingly, the holder device 200 can be made by a simple manufacturing process, and can be easily installed.

Each of the contact members 220 has a forefront surface 240 that comes in contact with the valve body 81. In the present embodiment, an inner diameter of an annular ring formed by the contact members 220 does not extend so as to come closer to the forefront surface 240. An area of the forefront surface 240 is larger than an area of the forefront surface 24, 29 of the contact member 22, 26 in a third and fourth embodiments. The forefront surface 240, by having relatively large area, receives thrust force from the valve body 81, so that the contact members 220 can endure larger thrust force. As shown in FIG. 12, a foremost end of the elastic member 210 does not protrude beyond the forefront surfaces 240 of the contact members 220. Therefore, even if excessively large thrust force acts on the holder device 200, it is possible to inhibit wear of the elastic member 210. The elastic member 210 in the present embodiment can resist damage by being relatively long in an axial direction as compared with a case where the elastic member has metal wire-like shape. Thus, even if the elastic member 210 and the contact members 220 are shaped differently from those in a third and fourth embodiments, it is possible to raise surface hardness and rigidity of the contact members 220. As in the above-described embodiments, the holder device 200 according to the present embodiment can be used in a position subjected to excessively large thrust force.

Other Embodiments

Figure 13:
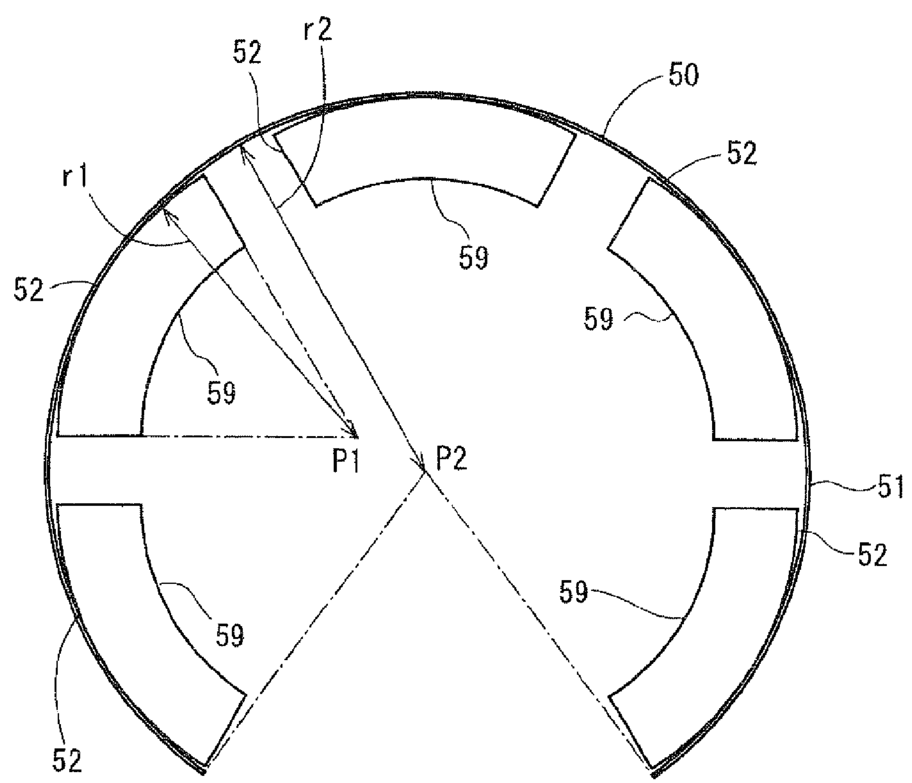
FIG. 13 is a diagram illustrating a plan view of an exemplary holder device according to a modified embodiment.

In accordance with a first and second embodiment as described above, the C-ring device 30, 40 is compressed in the radial direction by applying force at assembly holes 33, 43 and/or at engagement grooves 471, and is fitted in a cylindrical hole of a target member. However, the holder device may not have the assembly holes. For example, the holder device may be configured without the assembly holes as a C-ring device 50 shown in FIG. 13. In order to install the C-ring device 50, a conically tapered assembly jig is inserted into a radially inner side of inner circumferential surfaces 59 of arc keys 52 of the C-ring device 50. A tip end of the conically tapered assembly jig, at which a width of the tapered assembly jig is minimized, is inserted into the cylindrical hole of the target member. By sliding the inner circumferential surfaces 59 of the arc keys 52 on the conically tapered assembly jig toward the tip end, a diameter of an annular ring formed by the inner circumferential surfaces 59 of the arc keys 52 is gradually narrowed, and the C-ring device 50 is press-fitted into the cylindrical hole of the target member.

In the above-described embodiments, the number of the arc keys 32, 42, 52 is five, and the number of contact members 22, 26, 220 is two. However, the number of the contact members may be an arbitrary number greater than one.

In the above-described embodiments, the holder device is used for preventing the metering valve from coming off. Alternatively, the holder device may be used in a construction that needs a mechanism for preventing a member such as a pump and a valve portion in a fuel injector from coming off. The holder device may have a construction in which annularly arranged contact members are pushed radially outward against elastic force of a elastic member, and inner circumferential surfaces of the contact members support a shaft not to come off. The holder device according to the present invention may be used also for coupling axially aligned two or more members with each other.

The holder device is effectively used in a position subjected to large thrust force. However, the holder device according to the present invention may be applied in other constructions for preventing a member from coming off. For example, by differentiating materials of the elastic member and the contact members from each other, it is possible to improve elasticity of a whole body of the holder device in the radial direction. Accordingly, the materials of the elastic member and the contact members are not limited to metals. The materials of elastic member and the contact members and a shape of a contact surface that comes in contact with a target member may be appropriately changed in accordance with various configurations.

The invention is not limited only to the above-described embodiments, but may be put into practice in various forms. Additional advantages and modifications will readily occur to those skilled in the art. The invention in its broader terms is therefore not limited to the specific details, representative apparatus, and illustrative examples shown and described but only by the scope of the appended claims.

What is claimed is:

1. A holder device comprising:

an elastic member curved to extend approximately along a major arc of curvature, the elastic member being elastically deformable so as to change its radius of curvature; and contact members circularly arranged along one of an inner circumferential side and an outer circumferential side of the elastic member so that a sidewall of each of the contact members is opposed to the elastic member in a radial direction of the elastic member, wherein:

the sidewall is curved along an arc of curvature;

a radius of curvature of the sidewall is shorter than the radius of curvature of the elastic member when no force is applied to elastically deform the elastic member;

the sidewall is formed on an inner side of each of the contact members in the radial direction;

the elastic member is disposed on an inner side of the sidewall of each of the contact members in the radial direction in a state where the elastic member is elastically deformed so that it conforms to a shape of the sidewall of each of the contact members;

each of the contact members has a forefront surface on a foremost end thereof in an axial direction of the elastic member;

the inner side of each of the contact members has a step such that an inner diameter of an annular ring formed by the contact members is larger on a forefront surface side than on an aftermost side located opposite the forefront surface side in the axial direction;

the sidewall extends from the step to the forefront surface on the inner side of each of the contact members; and the elastic member is positioned between the step and the forefront surface.

2. The holder device according to claim 1, wherein:

the elastic member has a first side and a second side in the axial direction such that the first side is closer to the forefront surface of each of the contact members than the second side; and the first side of the elastic member is one of: aligned with; and located behind, the forefront surface of each of the contact members so that the first side of the elastic member does not protrude beyond the forefront surface of each of the contact members in the axial direction.

* * * * *